(12) United States Patent
Corveleyn et al.

(10) Patent No.: US 9,023,977 B2
(45) Date of Patent: May 5, 2015

(54) TRIAZINE CONTAINING FLUOROPOLYETHER ELASTOMERS HAVING VERY LOW GLASS TRANSITION TEMPERATURES, COMPOSITIONS CONTAINING THEM AND METHODS OF MAKING THEM

(75) Inventors: Steven G. Corveleyn, Knokke-Heist (BE); Rudolf J. Dams, Antwerp (BE); Werner M. A. Grootaert, Oakdale, MN (US); Gregg D. Dahlke, Saint Paul, MN (US); Miguel A. Guerra, Woodbury, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 400 days.

(21) Appl. No.: 13/500,526

(22) PCT Filed: Oct. 5, 2010

(86) PCT No.: PCT/US2010/051422
§ 371 (c)(1),
(2), (4) Date: Apr. 5, 2012

(87) PCT Pub. No.: WO2011/044093
PCT Pub. Date: Apr. 14, 2011

(65) Prior Publication Data
US 2012/0220719 A1 Aug. 30, 2012

(30) Foreign Application Priority Data
Oct. 6, 2009 (GB) .................................. 0917450.9

(51) Int. Cl.
C08G 65/00 (2006.01)

(52) U.S. Cl.
CPC .................................... C08G 65/007 (2013.01)

(58) Field of Classification Search
CPC .............................. C08G 63/44; C08G 65/007
See application file for complete search history.

(56) References Cited

U.S. PATENT DOCUMENTS

| | | | |
|---|---|---|---|
| 3,317,484 A | 5/1967 | Gerhard et al. | |
| 3,976,603 A | 8/1976 | Caporiccio et al. | |
| 4,394,489 A * | 7/1983 | Aufdermarsh | 525/370 |
| 4,440,917 A | 4/1984 | Resnick | |
| 4,567,301 A * | 1/1986 | Rosser et al. | 564/243 |
| 5,545,693 A * | 8/1996 | Hung et al. | 525/187 |
| 5,681,921 A | 10/1997 | Iwa et al. | |
| 5,693,748 A * | 12/1997 | Ikeda et al. | 528/421 |
| 6,294,627 B1 | 9/2001 | Worm et al. | |
| 7,259,208 B2 * | 8/2007 | Guerra et al. | 525/178 |
| 7,560,517 B2 | 7/2009 | Hintzer et al. | |
| 2003/0096930 A1 | 5/2003 | Wlassics et al. | |
| 2004/0072959 A1 * | 4/2004 | Grootaert et al. | 525/326.3 |
| 2005/0090598 A1 | 4/2005 | Tanaka et al. | |
| 2006/0199898 A1 | 9/2006 | Funaki et al. | |
| 2008/0035883 A1 * | 2/2008 | Andreevich et al. | 252/182.17 |

FOREIGN PATENT DOCUMENTS

| | | |
|---|---|---|
| EP | 0422231 A1 | 4/1991 |
| EP | 0979832 A1 | 2/2000 |
| EP | 1712580 A1 | 10/2006 |
| JP | H04-264504 A | 9/1992 |
| JP | 07-285948 A | 10/1995 |
| KR | 2001-0089828 A | 10/2001 |
| KR | 2007-0089247 A | 8/2007 |
| WO | WO 96/28509 A1 | 9/1996 |
| WO | WO 00/12581 A1 | 3/2000 |
| WO | WO 2005/000917 A1 | 1/2005 |
| WO | WO 2006068685 A1 * | 6/2006 |
| WO | WO 2008063905 A1 | 5/2008 |
| WO | WO 2008/130557 A1 | 10/2008 |

OTHER PUBLICATIONS

Rosser et al. "Polyperfluoroalkylene Ethers as High-Temperature Sealants", ACS Symposium Series, 1975, American Chemical Society, pp. 185-198.*

* cited by examiner

*Primary Examiner* — Nicole M Buie-Hatcher
(74) *Attorney, Agent, or Firm* — C. Michael Geise

(57) ABSTRACT

A method of making a fluoropolyether elastomer containing triazine groups and having a glass transition temperature of less than −40° C., including providing (i) one or more saturated fluoropolyethers containing repeating moieties selected from (—$C_4F_8O$—), (—$C_3F_6O$—), (—$C_2F_4O$—), (—$CF_2O$—) and combinations thereof and further containing at least one functional group at a terminal carbon atom of the backbone chain, or of a side chain if present, wherein the terminal carbon atom may be a primary or secondary carbon atom and wherein the functional group is capable of reacting with a functional group of the fluorinated compound according to (ii) below to form a triazine ring, (ii) one or more fluorinated compound containing at least one perfluorinated alkyl or perfluorinated alkylene moiety wherein the carbon atoms of the perfluorinated alkyl or alkylene moiety may be interrupted by one or more oxygen atoms and wherein the fluorinated compound further contains at least one functional group capable of reacting with the functional group of the one or more fluoropolyethers to form a triazine; curing the components according to (i) and (ii) to form triazines. Further provided are cured compositions, articles comprising the cured compositions and methods of making articles.

9 Claims, No Drawings

US 9,023,977 B2

TRIAZINE CONTAINING FLUOROPOLYETHER ELASTOMERS HAVING VERY LOW GLASS TRANSITION TEMPERATURES, COMPOSITIONS CONTAINING THEM AND METHODS OF MAKING THEM

CROSS REFERENCE TO RELATED APPLICATIONS

This application is a national stage filing under 35 U.S.C. 371 of PCT/US2010/051422, filed Oct. 5, 2010, which claims priority to Great Britain Application No. 0917450.9, filed Oct. 6, 2009, the disclosure of which is incorporated by reference in their entirety herein.

FIELD

The present disclosure relates to triazine containing fluoropolyether elastomers having low glass transition temperatures, compositions containing them, their precursor compositions and to methods of making them and to articles containing them.

BACKGROUND ART

Fluoroelastomers have elastomeric properties (high elongation at break) and show high resistance to heat and chemicals. They can be prepared by curing amorphous fluoropolymers. The polymer architecture resulting from the curing reaction provides the elastomeric properties. Fluoroelastomers have been widely used as raw materials and major component of elastomer compositions. Elastomer compositions have been used in producing seals (such as, for example, O-rings), coatings, laminates and hoses, in particular in containers for medical applications or in applications in the automotive or aircraft industry where resistance to fuel is desired. In many such applications it is desired that the fluoroelastomers retain their elastomeric properties over a wide temperature range. In particular when used in aircrafts, motorcrafts and watercrafts or in articles used in cryogenic applications or conditions, fluoroelastomers are required to be sufficiently flexible or elastomeric also at temperatures below −50° C. or even below −70° C. At temperatures above the glass transition temperature (Tg) sufficient thermal energy is available to allow motion of the segments in the main backbone chain of the polymer to provide sufficient flexibility. Thus for being applicable in low temperature applications, fluoroelastomers having a very low Tg are required.

Fluoroelastomers for use in fluoroelastomer compositions of high chemical and temperature resistance and good mechanical properties may be prepared by curing a system comprising olefinically unsaturated perfluorovinyl ethers and cure site monomers. Typically, glass transition temperatures of about −30° C. can be obtained by such systems.

A different approach has relied on the formation of fluoroelastomers containing polytriazines by reacting functionalised fluoropolyethers with suitable catalysts. For example, U.S. Pat. No. 5,693,748 reports a method wherein a functionalised perfluoropolyether was converted first into a polyimidoylamidine. The resulting linear polyimidoylamidine polymer was then treated with acylating agents to convert the imidoylamidine groups into triazines. By using functionalised acylating agents polytriazines were generated carrying pendant nitrile groups that were cured using ammonia as curing catalyst. The resulting polymer was reported to have a Tg of −45° C. However, the cured polymers were brittle and thus not usable as elastomers when the polymer unit bearing the pendant nitrile group had a molecular weight of less than about 25,000 g/mole per nitrile group.

Although a wide range of fluoropolymers of different chemical composition is known, commercial fluoroelastomer compositions having despite their high elongation at break also good mechanical properties like high tensile strength appear to have glass transition temperatures of only around −20° C. (compare A van Cleef, in Modern Fluoropolymers, John Scheirs ed., John Wiley & Sons, 1997, pages 597-613).

There has been a continuous need to provide fluoroelastomers having a glass transition temperature below −20° C., preferably below −50° C. or even lower. It is desirable that the flexibility at low temperatures is not compromised by reduced mechanical properties like tensile strength. Preferably, the fluoroelastomers can be prepared by curing in closed molds to reduce the exposure of operators to fumes generated by the curing process.

SUMMARY

It has now been found that fluoroelastomers having low glass transition temperatures of −40° C. or less can be prepared that have good mechanical and curing properties.

Therefore, in one aspect there is provided a method of making a fluoropolyether elastomer containing triazine groups and having a glass transition temperature of less than −40° C., comprising a) providing (i) one or more saturated fluoropolyethers containing repeating moieties selected from (—$C_4F_8O$—), (—$C_3F_6O$—), (—$C_2F_4O$—), (—$CF_2O$—) and combinations thereof and further containing at least one functional group at a terminal carbon atom of the backbone chain, or of a side chain if present, wherein the terminal carbon atom may be a primary or secondary carbon atom and wherein the functional group is capable of reacting with a functional group of the fluorinated compound according to (ii) below to form a triazine ring, (ii) one or more fluorinated compound containing at least one perfluorinated alkyl or perfluorinated alkylene moiety wherein the carbon atoms of the perfluorinated alkyl or alkylene moiety may be interrupted by one or more oxygen atoms and wherein the fluorinated compound further contains at least one functional group capable of reacting with the functional group of the one or more fluoropolyethers to form a triazine, b) curing the components according to (i) and (ii) to form triazines.

There is further provided a method of making an elastomer composition having a glass transition temperature of less than −40° C., a tensile strength of at least 1.5 MPa and an elongation at break of at least 50% and comprising a fluoropolyether elastomer having triazine groups, said method comprising a) providing (i) one or more saturated fluoropolyethers containing repeating moieties selected from (—$C_4F_8O$—), (—$C_3F_6O$—), (—$C_2F_4O$—) or (—$CF_2O$—) or combinations thereof and further containing at least one functional group at a terminal carbon atom of the backbone chain or of a side chain if present and wherein the terminal carbon atom may be a primary or secondary carbon atom and wherein the functional group is capable of reacting with a functional group of the fluorinated compound according to (ii) below to form a triazine, (ii) one or more fluorinated compounds containing at least one perfluorinated alkyl or perfluorinated alkylene moiety wherein the carbon atoms of the perfluorinated alkyl or alkylene moiety may be interrupted by one or more oxygen atoms and wherein the fluorinated compound further contains at least one functional group capable of reacting with the functional group of the one or more fluoropolyethers to form a triazine, (iii) at least one filler, b) curing the components according to (i) and (ii) to form triazines.

In another aspect there is provided a composition comprising a fluoropolyether elastomer containing triazine groups and repeating moieties selected from ($-C_4F_8O-$), ($-C_3F_6O-$), ($-C_2F_4O-$), ($-CF_2O-$) and combinations thereof and at least one filler, the composition having a glass transition temperature of less than −40° C., a tensile strength of at least 1.5 MPa and an elongation at break of at least 50%.

In a further aspect there is provided a curable composition comprising (i) one or more (saturated) fluoropolyethers comprising repeating moieties selected from ($-C_4F_8O-$), ($-C_3F_6O-$), ($-C_2F_4O-$), ($-CF_2O-$) or combinations thereof and at least one functional group at a terminal carbon atom of the backbone of the fluoropolyether, or of a side chain, if present and wherein the terminal carbon atom may be a primary or secondary carbon atom and wherein the functional group is capable of reacting with a functional group of the fluorinated compound according to (ii) below to form a triazine, (ii) one or more fluorinated compound containing at least one perfluorinated alkyl or perfluorinated alkylene moiety wherein the carbon atoms of the alkyl or alkylene moiety may be interrupted by one or more oxygen atoms and containing at least one functional group capable of reacting with the functional group of the one or more fluoropolyethers to form a triazine.

In yet another aspect there is provided a shaped article comprising the cured compositions described above.

In a further aspect there is provided a method of making an article comprising injection molding or compression molding a composition comprising a curable composition described above.

By the methods provided herein curable materials (fluoroelastomer precursors) can be prepared that have a paste-like consistency and can thus easily be injection molded avoiding material leaking out of the molds.

The curable materials can also be cured by molding in closed molds. This further reduces the risk of workers to be exposed to fumes generated in open mold curing. The materials are easily curable and can reach a maximum (delta) torque (MH-ML) (measured according to ASTM D 5289-93a) of 4 in. lbs with a cure onset (as indicated with Ts2) of less than 30 min when cured at 177° C.

Cured materials may be obtained that have good mechanical properties, such as for example a tensile strength of greater than 1.5 MPa, preferably greater than 2 MPa, and elongation at break of at least 50% and a compression set value of less than 50%. Such materials may further have a shore A hardness of at least 15.

DETAILED DESCRIPTION

Before any embodiments of this disclosure are explained in detail, it is to be understood that the disclosure is not limited in its application to the details of compositions and the arrangement of components set forth in the following description. The invention is capable of other embodiments and of being practiced or of being carried out in various ways. Also, it is to be understood that the phraseology and terminology used herein is for the purpose of description and should not be regarded as limiting. Contrary to the use of "consisting", the use of "including," "containing", "comprising," or "having" and variations thereof is meant to be of broad scope and is meant to encompass the items listed thereafter, equivalents thereof and further items. The word "consisting of" is meant to be of limiting scope and is meant to encompass only the items listed thereafter and equivalents thereof but not any additional items. The term "consisting essentially of" has a meaning as defined in the description below.

The use of "a" or "an" is meant to encompass "one or more". Any numerical range recited herein is intended to include all values from the lower value to the upper value of that range. For example, a concentration range of from 1% to 50% is intended to be an abbreviation and to expressly disclose the values between the 1% and 50%, such as, for example, 2%, 40%, 10%, 30%, 1.5%, 3.9% and so forth.

The fluoropolyether elastomers and compositions containing them provided herein can be obtained by heat-curing a fluoropolyether precursor composition. The precursor composition (curable composition) comprises fluoropolyethers containing at least one functional group and one or more fluorinated compounds containing at least one functional group capable of reacting with the functional group of the fluoropolyethers to form a triazine group upon curing. The fluorinated compound is a curing coagent and contains not only the functional group necessary for forming the triazine group but also perfluorinated alkyl or alkylene residues, which become part of the triazine structure as side chains of the triazine rings. Thus the fluorinated compounds (curing coagents) get (at least partially) incorporated into the fluoropolyether polymer formed upon curing. It is believed that this polymer architecture allows for the manufacture of elastomer compositions having a very low glass transition temperature, high elongation and good mechanical properties such as tensile strength.

The methods provided herein allow for the manufacture of fluoropolyether elastomers containing triazine groups and having a glass transition temperature of less than about −40° C., less than about −50° C., less than −80° C. or even less than −100° C.

The individual components and methods steps will be described in greater detail in the following.

Functionalised Fluoropolyethers:

Suitable functionalized fluoropolyethers include molecules containing repeating moieties selected from ($-CF_2O-$), ($-C_2F_4O-$), ($-CF_2O-$) and ($-C_2F_4O-$), or a combination of one or more of ($-CF_2O-$), ($-C_4F_8O-$), ($-C_3F_6O-$) and ($-C_2F_4O-$) and one or more functional groups. The fluoropolyethers are saturated. They can be linear or branched. The fluoropolyethers are preferably perfluorinated which means that they, with exception of the functional group(s), only consist of C, O and F atoms.

Preferably, the saturated fluoropolyethers consist essentially of units selected from ($-CF_2O-$), ($-C_2F_4O-$), ($-C_3F_6O-$) and ($-C_4F_8O-$), or a combination of one or more of ($-CF_2O-$), ($-C_4F_8O-$), ($-C_3F_6O-$) and ($-C_2F_4O-$) and one or more functional groups capable of forming a triazine group. The term "consisting essentially of" as used herein means the compound contains at least 80 mole %, preferably at least 90 mole %, of the aforementioned units.

The remainder preferably include perfluorinated alkyl and/or perfluorinated alkylene groups wherein the carbon chain may or may not be interrupted by oxygen atoms.

In one embodiment the fluoropolyether consist essentially of repeating moieties selected from ($—C_4F_8O—$), ($—C_3F_6O—$), ($—C_2F_4O—$), and/or ($—CF_2O—$) and combinations thereof and one or more group Rf—Z, and one or more group Rf'—(Z')$_n$, wherein Z and Z' are different or identical functional groups capable of reacting with one or more functional group of the fluorinated compound to form a triazine ring linking fluoropolyether and fluorinated compound and wherein Rf, Rf' are independent from each other perfluorinated alkyls or alkylenes that can contain one or more oxygen atoms interrupting the carbon chain and n is 1 or 0. Preferably at least one, more preferably at least two of Rf—Z and Rf'—Z' are placed at a terminal carbon atom of the fluoropolyether. The terminal carbon atom may be a primary or secondary carbon atom.

The functional group is a functional group capable of reacting to form a triazine. Such functional groups include nitrogen containing groups that can react with other nitrogen containing groups to form a triazine. Preferably they can react to form a triazine upon application of heat, for example upon a heat-treatment of for example 50° C., 80° C., 120° C., 170° C. or 177° C. Typical examples of groups capable of forming a triazine include nitriles, amidines, imidates, amidrazones, amidoximes, amydoiylimidines and salts thereof.

The at least one functional group is positioned at a terminal position of the fluoropolyether. The term "terminal position" (or "terminal carbon") as used herein encompasses the terminal position (or carbon) of the fluoropolyether backbone and also the terminal position (or carbon) of a side chain in case of a non-linear fluoropolyether. The terminal position (or terminal carbon) as used herein is the last (also referred to herein as "primary carbon") and the second but last carbon atom (also referred to herein as "secondary carbon atom") of the backbone or a side chain respectively. Preferably, the terminal position terminal carbon is the last carbon (primary carbon) of the fluoropolyether backbone or of a side chain.

It is understood that for the formation of triazines several corresponding functional groups are required. These are provided by the fluorinated compound and/or further fluoropolyethers. Therefore, the type of functional group of the fluoropolyethers can be adapted to the type of functional groups of the fluorinated compounds and vice versa.

Preferably, the functional group of the perfluoropolyether is a nitrile group. More preferably the perfluoropolyether contains two or more functional groups that can react with a functional group of the fluorinated compound to form triazine rings, i.e. the fluoropolyethers may be bifunctional or multifunctional. Preferably the two or more functional groups are preferably all nitrile groups.

The fluoropolyethers may be mixtures. Preferred are mixtures having a degree of bifunctionality of at least 50%, preferably at least 80%, more preferably at least 85% as can be determined, for example, with F-NMR.

The fluoropolyethers are typically liquids. They are typically also of low molecular weight. The fluoropolyethers may generally have a molecular weight of less than 15,000 g/mole, typically from about 400 g/mole to about 15,000 g/mole, preferably less than 9,000 g/mole. Typically the perfluoropolyether have a weight average of from about 400 g/mole to about 9,000 g/mole. The fluoropolyethers may be mixtures and the molecular weight referred to above may be the weight average molecular weight.

Saturated (per)fluoropolyethers are known and their synthesis has been described since long. For example, perfluoropolyethers having a backbone characterized by blocks of repeating units of the formula $—CF_2CF_2O—$ can be made from tetrafluoroethylene epoxide, as described in U.S. Pat. No. 3,125,599. Others, made by reacting oxygen with tetrafluoroethylene are characterized by a backbone made of repeating $—CF_2O—$ units (see for example U.S. Pat. No. 3,392,097). Perfluoropolyethers having a backbone of $—C_3F_6O—$ units in combination with $—CF_2O—$ and $—CF(CF_3)O—$ units are described for example in U.S. Pat. No. 3,699,145. Further useful examples of perfluoropolyethers include those having a backbone of repeating $—CF_2O—$ and $—CF_2CF_2O—$ units (as is disclosed in U.S. Pat. No. 3,810,874). Perfluoropolyethers can be also obtained by the polymerization of HFPO using dicarboxylic fluorides as polymerization initiators, as is described for example in U.S. Pat. Nos. 4,647,413 and 3,250,808. Perfluoropolyethers derived from HFPO contain branched perfluoroalkyl groups and at least one of the units ($—C_3F_6O—$) is not linear, e.g. the ($—C_3F_6O—$) is a $—CF_2—CF(CF_3)—O—$ unit. HFPO derived perfluoropolyethers are also commercially available, for example, under the trade designation of KRYTOX, from Dupont de Nemours. Fluoropolyether, in particular of the linear type and including functionalised fluoropolyethers are also commercially available, for example under the trade designation of FOMBLIN, FOMBLIN Z DEAL from Solvay Solexis and DEMNUM from Daikin.

The conversion of functionalised fluoropolyethers into fluoropolyethers containing functional groups capable to form triazine rings as those described below can be carried out by known methods of organic synthesis or can be carried out, for example, as described in U.S. Pat. No. 5,545,693.

Fluoropolyether compounds having nitrile functional groups can be obtained from the corresponding precursor perfluoropolyethers as is described, for example, in U.S. Pat. No. 3,810,874 or U.S. Pat. No. 4,647,413 or U.S. Pat. No. 5,545,693. By their way of synthesis, the precursor perfluoropolyethers typically have acid fluoride end groups. These acid fluoride end groups may be converted to esters via reaction with an appropriate alcohol (such as methanol). The esters may be subsequently converted to amides via reaction with ammonia. The amides may then be dehydrated to nitriles in an appropriate solvent (such as DMF) with pyridine and trifluoroacetic anhydride. Alternatively the amides may be dehydrated with other reagents such as $P_2O_5$ or $PCl_3$.

Fluoropolyethers prepared from HFPO typically have secondary nitrile end groups. Linear perfluoropolyethers typically have primary nitrile end groups. Fluoropolyethers having amidine functional groups can be obtained from a reaction of the corresponding nitrile compounds with ammonia as is disclosed, for example, in U.S. Pat. No. 3,810,874. Fluoropolyethers having imidate functional groups can be obtained, for example, from a reaction of the corresponding nitriles with an alcohol as is described, for example, in U.S. Pat. Nos. 3,523,132 and 6,657,013. Fluoropolyether having amidrazone functional groups can be obtained from a reaction of the corresponding nitriles with hydrazine, as is described for example in U.S. Pat. No. 5,637,648.

Fluoropolyether compounds having amidoxime functional groups can be obtained, for example, from a reaction of the corresponding nitriles with hydroxylamine as is described for example in U.S. Pat. No. 4,145,524.

Fluorinated Compounds (Curing Coagents):

The fluorinated compounds are curing coagents. They can get incorporated into the polymer structure during the curing reaction.

Suitable coagents include compounds containing one or more functional groups linked to an organic residue.

The functional group(s) are capable of reacting with the functional group of the perfluoropolyether to form a triazine ring wherein the organic residue of the coagent becomes part of the triazine moiety.

Typically, the coagents correspond to the general formula

Y—(F)$_x$ wherein F represents a functional group, Y represents a fluorinated organic residue and x is 1 or 2 or greater than 2. Y is preferably a perfluorinated residue. Typically, the coagent is a compound that reacts with the at least one functional group of the one or more fluoropolyethers described above to form a triazine thus linking fluoropolyethers and coagents. Therefore, the coagent gets incorporated and consumed in the triazine formation reaction and is not a catalyst (which does not get consumed), like for example ammonia, urea or tetraphenyl tin. The formation of the triazine can be established using FT-IR (strong absorption peak at 1550-1560 cm$^{-1}$).

Examples of functional groups include, but are not limited to, nitrile and adducts of nitrile, such as amidines, imidates, amidoximes, amidrazones and their salts and combinations thereof. Preferably, the coagent is monofunctional or bifunctional, which means it contains either one or two functional groups. Mixtures of mono and di-functional coagents can also be used. The functional groups are preferably on a primary or secondary carbon.

Examples of Y include residues comprising at least one —CF$_2$— or —CF$_2$—O— moiety. Typical examples of residues include perfluoroalkyl, perfluoroalkylene, perfluorooxyalkyl perfluorooxyalkylene, perfluoropolyoxyalkyl or perfluoropolyoxyalkylene residues.

Preferably, the functional group of the perfluoropolyether is a nitrile group (or are nitrile groups) and the functional group of the coagent is not a nitrile group (or are not nitrile groups), but is or are adduct(s) of a nitrile group and salts thereof.

Examples of specific coagents containing nitrile adducts include fluorinated compounds containing mono- or bisamidine moieties, mono- or bisimidate moieties, mono- or bisamidrazone moieties and mono- and bisamidoxime moieties. Preferred coagents include fluoirinated monoamidine and bisamidine compounds.

Typical examples of fluorinated monoamidine or bisamidine compounds include those according to the general formula:

Rf$^1$—C(=NH)NH$_2$ and

H$_2$N(HN=)C—Rf$^1$—C(=NH)NH$_2$ and salts thereof,
wherein Rf$^1$ represents an unsubstituted or substituted fluorinated alkyl or alkylene group (e.g. a C1 to C20 alkyl or alkylene group), aryl group or arylene (e.g. a phenyl or naphthyl group) or aralkyl (arylalkylene) group (e.g. a toluoyl group). Examples of suitable substituents include hydrogen, halogen (e.g. chlorine, bromine, iodine) and alkyloxy groups. In addition, one or more of the carbon groups may be substituted by one or more heteroatoms such as oxygen and nitrogen.

Preferably Rf$^1$ is a linear or branched perfluoro or partially fluorinated C1-C10 group, wherein the carbon atoms may optionally be interrupted by oxygen atoms. Specific examples include C4 to C10 perfluoro alkyl (or alkylene), perfluorooxyalkyl (or alkylene) or perfluoropolyoxyalkyl (or alkylene) groups, such as CF$_3$—O—(CF$_2$)$_m$—O—CF(CF$_3$)—, wherein m is 1, 2, 3 or 4, and C$_3$F$_7$—(O—CF(CF$_3$)—CF$_2$)$_n$—O—CF(CF$_3$)—, wherein n is 0, 1, 2 or 3 or CF$_3$—O—(CF$_2$)$_p$—, or CF$_3$—(CF$_2$)$_p$— wherein p is 1, 2, 3, 4, 5, 6, 7, 8, or 9 or the corresponding alkylene groups in case of a bisamidine.

Useful salts of amidines include the carboxylic acid salts thereof. Particular useful carboxylic acids include perfluorinated carboxylic acids of formula CF$_3$(CF$_2$)$_j$COOH, wherein j is an integer of 0 to 8, preferably 1 to 3.

Examples of useful amidines include monoamidines as described in U.S. Pat. No. 6,846,880 incorporated herein by reference, such as, for example, CF$_3$—O—CF$_2$CF$_2$—C(=NH)NH$_2$ and salts thereof. Further useful amidines include bisamidines, such as for example perfluorosebacamidine, commercially available from Apollo Scientific, UK.

Typical examples of suitable imidates include those of the general formula:

HN=C(OR$^1$)—Rf$^1$ and

HN=C(OR$^1$)—Rf$^1$—C(OR$^{1'}$)=NH and salts thereof
wherein Rf$^1$ is as defined above with respect to the amidines. R1 and R1' represent, independently from each other, an unsubstituted or substituted alkyl group, such as C1-C10 alkyls, which may be branched or linear, —CH$_2$—Rf$^2$, —CH$_2$CH$_2$Rf$^2$, wherein Rf$^2$ is a perfluoro or partially fluorinated C1-C10 group. Typical examples of suitable imidates are described, for example, in U.S. Pat. No. 6,657,013, incorporated herein by reference.

Examples of suitable amidrazones include compounds according to the general formula:

Rf$^1$[—C(NH)NHNH$_2$]$_n$ and salts thereof wherein Rf$^1$ is as defined above with respect to the amidines and n is 1 or 2. Typical examples include those as described in U.S. Pat. No. 5,637,648, incorporated herein by reference.

Examples of suitable amidoximes include compounds according to the general formula Rf$^1$—[C(NH$_2$)NOH]$_n$ wherein Rf$^1$ is as described above for the amidines and n is 1 or 2. Typical examples of suitable amidoximes are described, for example, in U.S. Pat. No. 5,668,221, incorporated herein by reference.

Suitable functional groups are also nitrile groups, in which case the functional group of the perfluoropolyether is preferably chosen not to be a nitrile group, but an adduct of a nitrile group, as for example an amidine, imidate, amidoxime or amidrazone and salts thereof.

Suitable coagents also include the fluoropolyethers described above in which case the fluoropolyethers used as coagents have different functional groups than the fluoropolyethers they are to react with to form the triazines.

Examples of suitable nitrile containing coagents include for examples fluoropolyether mono and dinitriles, such as for example, those derived from HFPO or (prepared from the corresponding ester as is given above). Further suitable examples include mono- and dinitriles, such as, for example, perfluoroalkyl mono- and dinitriles.

Method of Making Fluoropolyether Elastomers and Fluoropolyether Elastomer Compositions:

For making fluoropolyether elastomers containing triazine groups and having a glass transition temperature of less than about −40° C., less than about −50° C., less than −80° C. or even less than −100° C., the fluoropolyethers and fluorinated compounds as described above are combined and cured to form triazines.

Fluoropolyethers and fluorinated compounds are used in effective amounts to produce fluoropolyether elastomers having the glass transition temperatures described above or the fluoroelastomer compositions having one or more or all of the mechanical properties described below. Typically, the fluoropolyethers are used in great excess compared to the fluorinated compounds. Typically, about 0.1 to about 10 parts, or about 0.2 to about 5 parts of fluorinated compounds are used per 100 parts fluoropolyether (all based on weight).

To prepare the curable fluoropolyether compositions, the ingredients are intimately mixed. Known mixing devices such as, for example, rotary mixers, double planetary mixers, a high speed dispenser or a Hauschild™ Speedmixer may be used. The curable fluoropolyether composition is typically a liquid or a paste. For convenient processing, the paste typically has a Brookfield viscosity between 2,000 and 50,000 centipoises at 25° C.

Fillers and other additives may be added. Preferably the fillers and the other additives are added before curing the composition. The fillers may be added to increase the viscosity of the perfluoropolyether—coagent mixture, which typically is a liquid, to obtain a paste-like consistency.

Fillers are typically particles. The particles may be spherical or non-spherical particles. They may be rods or fibers. Typically the fillers are microsized materials. Typically they have a length or a diameter less than 5,000 µm, or even less than 1,000 µm, or less than 500 µm. Fillers, in particular carbon or silica-containing materials are available in particles sizes (number average) as small as between 0.05 and 30 µm.

Fillers include inorganic or organic materials. Typical fillers include silicone-containing materials. Examples of silicon-containing fillers include silicas (also referred to as silicon dioxides). Specific examples of silicas include hydrophilic and hydrophobic silica, fumed silica (which are, for example, commercially available under the trade designation AEROSIL from Evonik GmbH, Frankfurt, Germany, such as, for example, AEROSIL 200, AEROSIL R972 or AEROSIL R974; available under the trade designation NANOGEL from Cabot Corporation), silane-treated fumed silicas (commercially available, for example, under the trade designation CABOSIL from Cabot Corporation) and combinations thereof. Further examples include silicates such as, for example, calcium silicates, aluminium silicates, magnesium silicates and mixtures thereof, such as for example mica, clays and glasses, such as for example glass spheres (commercially available under the trade designation GLASS-BUBBLES from 3M Company). Further examples of suitable silicas include nitrile-modified silicas. Nitrile-modified silicas can be prepared by reacting a commercially available hydroxyl containing silica, such as, for example, AEROSIL 200V (available from Evonik), with a cyano-silane, such as, for example, 3-cyanopropyltriethoxysilane (available from Aldrich), in the presence of ethanol containing hydrochloric acid. The amount of reactants is typically chosen so as to obtain between 10 and 30% (by weight) of nitrile-modified silica. Further suitable silica-containing fillers include fluorine-modified silicas. Fluorine-modified silicas can be prepared, for example, by reacting a commercially available hydroxyl containing silica, (for examples AEROSIL 200V) with a fluorosilane. A suitable fluorosilane includes HFPO-silanes, which may be prepared from oligomeric HFPO-esters and a silane, such as for example aminoalkyltrialkoxy silane, as is described in U.S. Pat. No. 3,646,085. Further suitable fluorosilanes can be derived from commercially available perfluoropolyethers, such as, for example, FOMBLIN Z Deal (Solvay Solexis) that have been reacted with aminoalkyltrialkoxy silanes, such as 3-aminopropyltrimethoxysilane, as is described in U.S. Pat. No. 6,716,534. The amount of reactants is typically chosen so as to obtain between 1 and 5% (by weight) of fluorine modified silica.

Other examples of suitable fillers include carbon-containing materials. Carbon-containing materials include, for example, carbon nanotubes, carbon black or subtypes thereof like, for example, acetylene black, modified carbons, such as, for example graphite fluoride. Graphite fluoride is commercially available, for example, from Central Glass. Carbon black is commercially available, for example, from Cabot Corporation.

The fillers will typically be added in an amount between about 5 to about 50 parts, or between about 10 and 30 parts, by weight per hundred parts by weight of fluoropolyether (phr).

The fluoropolyether elastomer compositions may include further additives. Examples include pigments, antioxidants, processing aids, rheology modifiers, lubricants, flame retardants, flame retardant synergists, antimicrobials, and further additives known in the art of fluoropolymer compounding and rubber processing.

Further additives also include curing catalysts although they are not required, which is a further advantage of the methods provided herein. Curing catalysts are compounds that enable triazine formation, such as for example, ammonia, urea, acetaldehyde area, and organo metal compounds such as for example butyl tin compounds.

Curing may be carried out in molds. Molds typically used in curing rubbers and rubber processing may be employed. Curing may be carried out in open air, for example open molds, but is preferably carried out in closed molds. Curing in closed molds offers the advantage of not exposing the operators to fumes generated during the curing reaction. Therefore, an advantage of the curable compositions and methods provided herein lies in the fact that the compositions are curable in closed molds.

Curing is typically achieved by heat-treating the composition. The heat-treatment is carried out at an effective temperature and effective time to create an elastomer having triazines. Optimum conditions can be tested by examining the resulting elastomer for its mechanical and physical properties. Typically, the curing is carried out at a temperature of greater than 100° C., greater than 150° C. or at least 177° C. Typical curing conditions for curable fluoropolyether elastomer mixtures include temperatures between 160° C. and 210° C., typically 177° C. during 10 to 90 minutes. A pressure of 10 to 100 bar may be applied during the curing. Typically the curing is carried out over 30 minutes or at least 45 minutes. A post cure may be applied, typically at a temperature greater 200° C. for 20 hours or at a temperature of 250° C. for 20 hours.

The cured fluoropolyether elastomers typically reach a maximum torque (MH-ML) (measured according to ASTM D 5289-93a) higher than 4, and have an onset of cure (as indicated by Ts2) after less than 30 min cure at 177° C.

The method described above allows for the provision of fluoropolyether elastomer compositions having one or more or all of the following properties:
(i) a glass transition temperature (Tg) of less than −40° C., preferably less than −50° C., more preferably less than −80° C. or less than −100° C.;
(ii) an elongation at break of at least 50%, preferably at least 100% or even at least 200%;
(iii) a tensile strength of at least 1.5 MPa, preferably at least 2 MPa;
(iv) a shore A hardness of at least 15, preferably at least 25 and more preferably at least 40;
(v) a compression set of less than 50%, preferably less than 40%.

Typical embodiments have a glass transition temperature of less than −40° C., a tensile strength of at least 2 MPa, a shore A hardness of at least 25, an elongation at break of at least 200%. Typical embodiments in addition have also a compression set of less than 40%.

Articles and Methods of Making Articles:

The compositions provided herein may be used to make shaped articles, such as, for example, molded articles. Conventional processing techniques used in fluoropolymer compounding or processing may be used, such as injection molding, in particular liquid injection molding, or compression molding. Alternatively, articles in the form of a sheet can be made by curing a layer of the fluoropolyether compositions in an open air oven. Compression molding typically comprises placing a quantity of cold curable composition into a heated mold cavity and subsequently closing the mold using adequate pressure to shape the article. After retaining the mixture at sufficient temperature during sufficient time to allow vulcanization to proceed, it can then be demolded.

Liquid injection molding is a shaping technique whereby the curable composition is pumped into a heated chamber from which it is then injected into a hollow mold cavity by means of a hydraulic piston. After vulcanization the article can then be demolded.

The compositions provided herein may be used to make articles, such as, for example, O-rings, gaskets, tubes, linings, sheets, containers, lids, fuel tanks or components thereof, hoses or components thereof, and membranes.

In the following list specific embodiments will be described to further illustrate the invention. This list is provided for illustrative purposes and is not meant to limit the invention thereto.

1. A method of making a fluoropolyether elastomer containing triazine groups and having a glass transition temperature of less than −40° C., comprising
a) providing
(i) one or more saturated fluoropolyethers containing repeating moieties selected from ($-C_4F_8O-$), ($-C_3F_6O-$), ($-C_2F_4O-$), ($-CF_2O-$) and combinations thereof and further containing at least one functional group at a terminal carbon atom of the backbone chain, or of a side chain if present, wherein the terminal carbon atom may be a primary or a secondary carbon atom and wherein the functional group is capable of reacting with a functional group of the fluorinated compound according to (ii) below to form a triazine ring,
(ii) one or more fluorinated compound containing at least one perfluorinated alkyl or perfluorinated alkylene moiety wherein the carbon atoms of the perfluorinated alkyl or alkylene moiety may be interrupted by one or more oxygen atoms and wherein the fluorinated compound further contains at least one functional group capable of reacting with the functional group of the one or more fluoropolyethers to form a triazine,
b) curing the components according to (i) and (ii) to form triazines.

2. The method of 1 wherein the fluoropolyether elastomer has a glass transition temperature of less than −50° C.

3. The method of 1 or 2 wherein the fluoropolyether elastomer has a glass transition temperature of less than −80° C.

4. The method according to any one of 1 to 3 wherein the one or more fluoropolyethers of (i) have a molecular weight of less than 15,000 g/mole.

5. The method according to any one of 1 to 4 wherein the one or more fluoropolyethers of (i) are linear.

6. The method according to any one of 1 to 5 wherein the one or more fluoropolyethers of (i) are liquids.

7. The method according to any one of 1 to 6 wherein the one or more fluoropolyethers containing the at least one functional groups consist essentially of repeating moieties selected from ($-C_4F_8O-$), ($-C_3F_6O-$), ($-C_2F_4O-$), or ($-CF_2O-$) or combinations thereof and one or more group Rf—Z and one or more group Rf'—(Z')$_n$ placed at a terminal position of the fluoropolyether, wherein Z and Z' are different or identical functional groups capable of reacting with one or more functional group of the fluorinated compound to form a triazine and wherein Rf, Rf' are independent from each other perfluorinated alkyls or alkylenes that can contain one or more oxygen atoms interrupting the carbon chain and n is 1 or 0.

8. The method according to any one of 1 to 7 wherein the functional group of the fluoropolyethers is a nitrile group.

9. The method according to any one of 1 to 7 wherein the functional group of the fluorinated compound is a nitrile group.

10. The method according to any one of 1 to 7 wherein the functional group of the fluoropolyether is a nitrile group and wherein the functional group of the fluorinated compound comprises a moiety selected from amidines, amidrazones, imidates, amidoxime, and salts thereof and combinations thereof.

11. The method according to any one of 1 to 7 wherein the functional group of the fluoropolyether comprises a moiety selected from amidines, amidrazones, imidates, amidoxime, and salts thereof and combinations thereof and the functional group of the fluorinated compound comprises a nitrile group.

12. A method of making an elastomer composition having a glass transition temperature of less than −40° C., a tensile strength of at least 1.5 MPa and an elongation at break of at least 50% and comprising a fluoropolyether elastomer having triazine groups, said method comprising
a) providing of
(i) one or more saturated fluoropolyethers containing repeating moieties selected from ($-C_4F_8O-$), ($-C_3F_6O-$), ($-C_2F_4O-$) or ($-CF_2O-$) or combinations thereof and further containing at least one functional group at a terminal carbon atom of the backbone chain or of a side chain if present and wherein the terminal carbon atom may be a primary or secondary carbon atom and wherein the functional group is capable of reacting with a functional group of the fluorinated compound according to (ii) below to form a triazine,
(ii) one or more fluorinated compound containing at least one perfluorinated alkyl or perfluorinated alkylene moiety wherein the carbon atoms of the perfluorinated alkyl or alkylene moiety may be interrupted by one or more oxygen atoms and wherein the fluorinated compound further contains at least one functional group capable of reacting with the functional group of the one or more fluoropolyethers to form a triazine,
(iii) at least one filler,
b) curing the components according to (i) and (ii) to form triazines 13. The method of 12 wherein the elastomer composition has a glass transition temperature of less than −50° C.

14. The method of 12 wherein the elastomer composition has a glass transition temperature of less than −80° C.

15. The method of any one of 12 to 14 wherein the elastomer composition has an elongation at break of at least 100%.

16. The method according to any one of 12 to 15 wherein the elastomer composition has a tensile strength of at least 2 MPa.

17. The method according to any one of 12 to 16 wherein the elastomer composition has a shore A hardness of at least 15.

18. The method according to any one of 12 to 17 wherein the one or more fluoropolyethers of (i) have a molecular weight of less than 15,000 g/mole.

19. The method according to any one of 12 to 18 wherein the one or more fluoropolyethers of (i) are linear.

20. The method according to any one of 12 to 19 wherein the one or more fluoropolyethers of (i) are liquids.

21. The method according to any one of 12 to 20 wherein the one or more fluoropolyethers containing the at least one functional groups consist essentially of repeating moieties selected from ($-C_4F_8O-$), ($-C_3F_6O-$), ($-C_2F_4O-$), or ($-CF_2O-$) or combinations thereof and one or more group Rf—Z and one or more group Rf'—(Z')$_n$ placed at a terminal position of the fluoropolyether, wherein Z and Z' are different or identical functional groups capable of reacting with one or more functional group of the fluorinated compound to form a triazine and wherein Rf, Rf' are independent from each other perfluorinated alkyls or alkylenes that can contain one or more oxygen atoms interrupting the carbon chain and n is 1 or 0.

22. The method according to any one of 12 to 21 wherein the functional group of the fluoropolyether is a nitrile group.

23. The method according to any one of 12 to 21 wherein the functional group of the fluorinated compound is a nitrile group.

24. The method according to any one of 12 to 21 wherein the functional group of the fluoropolyether is a nitrile group and wherein the functional group of the fluorinated compound comprises a moiety selected from amidines, amidrazones, imidates, amidoxime, and salts thereof and combinations thereof.

25. The method according to any one of 12 to 21 wherein the functional group of the fluoropolyether comprises a moiety selected from amidines, amidrazones, imidates, amidoxime, and salts thereof and combinations thereof and the functional group of the fluorinated compound comprises a nitrile group.

26. A composition comprising a fluoropolyether elastomer containing triazine groups and repeating moieties selected from ($-C_4F_8O-$), ($-C_3F_6O-$), ($-C_2F_4O-$), ($-CF_2O-$) and combinations thereof and at least one filler, the composition having a glass transition temperature of less than $-40°$ C., a tensile strength of at least 1.5 MPa and an elongation at break of at least 50%.

27. The composition of 26 wherein the fluoropolyether elastomer is the reaction product of the triazine-forming reaction of
(i) one or more saturated fluoropolyethers containing repeating moieties selected from ($-C_4F_8O-$), ($-C_3F_6O-$), ($-C_2F_4O-$), ($-CF_2O-$) and combinations thereof and further containing at least one functional group at a terminal carbon atom of the backbone chain or of a side chain if present and wherein the terminal carbon atom may be a primary or secondary carbon atom and wherein the functional group is capable of reacting with a functional group of the fluorinated compound according to (ii) below to form a triazine,
(ii) one or more fluorinated compounds containing at least one perfluorinated alkyl or perfluorinated alkylene moiety wherein the carbon atoms of the alkyl or alkylene moieties may be interrupted by one or more oxygen atoms and containing at least one functional group capable of reacting with the functional group of the one or more fluoropolyethers to form a triazine.

28. The composition of 26 or 27 having a glass transition temperature of less than $-50°$ C.

29. The composition of 26 or 27 having a glass transition temperature of less than $-80°$ C.

30. The composition according to any one of 26 to 29 having an elongation at break of at least 100%.

31. The composition according to any one of 26 to 30 having a tensile strength of at least 2 MPa.

32. The composition according to any one of 26 to 31 having a shore A hardness of at least 15.

33. The composition according to any one of 27 to 32 wherein the one or more fluoropolyethers of (i) have a molecular weight of less than 15,000 g/mole.

34. The composition according to any one of 27 to 33 wherein the one or more fluoropolyethers of (i) are linear.

35. The composition according to any one of 27 to 34 wherein the one or more fluoropolyethers of (i) are liquids.

36. The composition according to any one of 27 to 35 wherein the one or more fluoropolyether containing the at least one functional groups consists essentially of repeating moieties selected from ($-C_4F_8O-$), ($-C_3F_6O-$), ($-C_2F_4O-$), or ($-CF_2O-$) or combinations thereof and one or more group Rf—Z and one or more group Rf'—(Z')$_n$ placed at a terminal position of the fluoropolyether, wherein Z and Z' are different or identical functional groups capable of reacting with one or more functional group of the fluorinated compound to form a triazine and wherein Rf, Rf' are independent from each other perfluorinated alkyls or alkylenes that can contain one or more oxygen atoms interrupting the carbon chain and n is 1 or 0.

37. The composition according to any one of 27 to 36 wherein the functional group of the fluoropolyether is a nitrile group.

38. The composition according to any one of 27 to 36 wherein the functional group of the fluorinated compound is a nitrile group.

39. The composition according to any one of 27 to 36 wherein the functional group of the fluoropolyether is a nitrile group and wherein the functional group of the fluorinated compound comprises a moiety selected from amidines, amidrazones, imidates, amidoxime, and salts thereof and combinations thereof.

40. The composition according to any one of 27 to 36 wherein the functional group of the fluoropolyether is selected from a moiety comprising a moiety selected from amidines, amidrazones, imidates, amidoxime, and salts thereof and combinations thereof and the functional group of the fluorinated compound is a nitrile group.

41. The composition according to any one of 26 to 40 wherein the filler is selected from a silicone containing material or a carbon containing material or a combination thereof.

42. A curable composition comprising
(i) one or more (saturated) fluoropolyethers comprising repeating moieties selected from ($-C_4F_8O-$), ($-C_3F_6O-$), ($-C_2F_4O-$), ($-CF_2O-$) or combinations thereof and at least one functional group at a terminal carbon atom of the backbone of the fluoropolyether, or of a side chain, if present and wherein the terminal carbon atom may be a primary or secondary carbon atom and wherein the functional group is capable of reacting with a functional group of the fluorinated compound according to (ii) below to form a triazine,
(ii) one or more fluorinated compound containing at least one perfluorinated alkyl or perfluorinated alkylene moiety wherein the carbon atoms of the alkyl or alkylene moiety may be interrupted by one or more oxygen atoms and containing at least one functional group capable of reacting with the functional group of the one or more fluoropolyethers to form a triazine.

43. The curable composition of 42 being a liquid or a paste.

44. The curable composition according to any one of 42 or 43 wherein the fluoropolyether containing the at least one functional group has a molecular weight of less than 15,000 g/mole.

45. The curable composition according to any one of 42 to 44 wherein the fluoropolyether containing the at least one functional group is linear.

46. The curable composition according to any one of 42 to 45 wherein the fluoropolyether consists essentially of repeating moieties selected from (—$C_4F_8O$—), (—$C_3F_6O$—), (—$C_2F_4O$—), or (—$CF_2O$—) or combinations thereof and one or more group Rf—Z and one or more group Rf'—(Z')$_n$ placed at a terminal position of the fluoropolyether, wherein Z and Z' are different or identical functional groups capable of reacting with one or more functional group of the fluorinated compound to form a triazine and wherein Rf, Rf' are independent from each other perfluorinated alkyls or alkylenes that can contain one or more oxygen atoms interrupting the carbon chain and n is 1 or 0.

47. The curable composition according to any one of 42 to 46 wherein the functional group of the fluoropolyether is a nitrile group.

48. The curable composition according to any one of 42 to 46 wherein the functional group of the fluorinated compound is a nitrile group.

49. The curable composition according to any one of 42 to 46 wherein the functional group of the fluoropolyether is a nitrile group and wherein the functional group of the fluorinated compound comprises a moiety selected from amidines, amidrazones, imidates, amidoximes, salts thereof and combinations thereof.

50. The curable composition according to any one of 42 to 46 wherein the functional group of the comprises a moiety selected from amidines, amidrazones, imidates, amidoximes, salts thereof and combinations thereof and the functional group of the fluorinated compound is a nitrile group.

51. The curable composition according to any one of 42 to 50 further comprising at least one filler.

52. The curable composition according to 51 wherein the at least one filler is selected from silica containing material, a carbon containing material or a combination thereof.

53. The curable composition according to any one of 42 to 52 which cures to a fluoropolyether elastomer composition containing triazine groups having a glass transition temperature of less than –40° C., a tensile strength of at least 1.5 MPa, an elongation at break of at least 50% upon heat treatment.

54. The curable composition according to any one of 42 to 52 which cures to a fluoropolyether elastomer composition containing triazine groups having a glass transition temperature of less than –80° C., a tensile strength of at least 2 MPa, an elongation at break of at least 100% upon heat treatment.

55. The curable composition according to any one of 42 to 52 which cures upon heat-treatment to a fluoropolyether elastomer composition containing triazine groups having a glass transition temperature of less than –80° C., a tensile strength of at least 2 MPa, an elongation at break of at least 100% and a shore A hardness of at least 15.

56. The curable composition according to any one of 53 to 55 wherein the heat treatment comprises subjecting the composition to 177° C. for 45 minutes.

57. A method of making a cured fluoropolyether elastomer composition containing triazines having a glass transition temperature of less than –40° C., preferably less than –50° C., more preferably less than –80° C., an elongation at break of at least 50%, preferably at least 100% and a tensile strength of at least 1.5 MPa, preferably at least 2 MPa, the method comprising providing a composition according to any one of 43 to 57 and subjecting the composition to a heat treatment.

58. A shaped article comprising the composition of any one of 26 to 41.

59. The article according to 58 wherein the article is selected from O-rings and gaskets.

60. Method of making an article comprising injection or compression molding a composition according to any one of 41 to 56.

The invention is further illustrated by the following examples. These following examples are provided to illustrate certain embodiments but are not meant to limit the invention thereto. Prior to that some test methods used to characterize materials and their properties will be described. Unless specified otherwise, percentages are percentages by weight with respect to the mass of the total compositions and add up in each case to 100 weight percent.

EXAMPLES

Test Methods

Hardness:

Hardness Shore A (2") was measured on samples that were post cured for 20 hours at 250° C., according to ASTM D-2240.

Glass Transition Temperature (Tg):

Tg was measured by modulated temperature DSC using a TA Instruments Q200 modulated DSC, available from TA Instruments. Conditions of measurement: –150° C. to 50° C. @ 2 or 3° C./min, modulation amplitude of +–1° C./min during 60 sec.

Tensile Strength at Break, Elongation at Break and Stress at 100% Elongation:

These properties were determined using an Instron™ mechanical tester with a 1 kN load cell in accordance with DIN 53504 (S2 DIE). All tests were run at a constant cross head displacement rate of 200 mm/min. Each test was run three times. The values reported are averages of the three tests. Stress at 100% Elongation, Elongation at Break, and Tensile Strength at Break were reported in units of Mega Pascals (MPa), %, and MPa respectively.

Curing Properties:

Vulcanisation properties were measured using an Alpha Technologies Moving Die Rheometer (at 177° C. in accordance with ASTM D 5289-93a, reporting minimum torque (ML), maximum torque (MH) and delta torque (which is the difference between MH and ML). Torque values are reported in. lbs. Also reported are tg δ @mL and tg δ @MH. Further reported are parameters indicating the curing speed such as Ts2 (the time required to increase the torque by two units over the ML); T50 (the time to increase torque above ML by 50% of delta torque), and T90 (the time to increase torque above ML by 90% of delta torque), all of which were reported in minutes.

Presence of Triazine Rings:

The presence of triazine rings was indicated by a strong absorption peak at 1550-1560 $cm^{-1}$ in FT-IR analysis. 50 µm thin samples of cured or post cured samples were submitted to FT-IR analysis.

Sample Preparation

Fluoroelastomer compounds in the form of a paste were made by mixing in a Hauschild™ Speedmixer (1 min at 2000 rpm, 1 min at 3500 rpm), 100 parts by weight of perfluoropolyether with coagent (fluorinated compounds) and fillers in parts per 100 parts by weight of perfluoropolyether as is given in the respective examples. The pastes were press cured in an Agila press (Agila PE 60 press from Agila NV in Ieper, Belgium, which is an example of a typical Rubber press with heated plates). Curing was carried out at 177° C. for 45 min and under a pressure of 20 bar. The fluoroelastomers were post cured in an oven during 20 hours at 250° C.

Materials Used:
Functionalised Perfluoropolyethers (PFE)
PFE-1: $NCCF_2O(CF_2O)_{9-11}(CF_2CF_2O)_{9-11}CF_2CN$ PFE-1 was made starting from the perfluoropolyetherdiester $CH_3OC(O)CF_2O(CF_2O)_{9-11}(CF_2CF_2O)_{9-11}CF_2C(O)OCH_3$ (average molecular weight of about 2000, obtained under the trade designation Fomblin™ Z-DEAL from Solvay Solexis) according to the process described in U.S. Pat. No. 5,545,693, example 3. In a first step, the perfluoropolyether diester was converted to the corresponding dicarbonamide using ammonia gas. In a second step, the dicarbonamide was converted to the corresponding dinitrile.

Curing Coagents (Fluorinated Compounds)
Coagent-1: $CF_3$—O—$CF_2CF_2$—$C(=NH)NH_3^{+-}OOCCF_3$, made according to U.S. Pat. No. 6,846,880 (Curative B in section examples, curatives, column 13, line 32).

Coagent-2: perfluorosebacamidine, commercially available from Apollo Scientific, UK.

Fillers
Nanogel™: available from Cabot Corporation
Cab-O-Sil® TS530: available from Cabot Corporation
Aerosil® 200V: hydroxyl containing silica, commercially available from Evonik
MT N-990: carbon black, medium thermal grade, available from Cancarb
Modified Silica Fillers (MFIL)
Fluorine Modified Silica (MFIL-1 and MFIL-2)

Fluorine modified silica MFIL-1 and MFIL-2 were prepared in a two step reaction. In a first step, a fluorosilane (composition given below) was prepared starting from the corresponding perfluoropolyether diester. In a second step, the fluorosilane was reacted with a commercially available hydroxyl containing silica, such as AEROSIL®200V (commercially available from Evonik). Therefore, in a closed beaker were mixed 100 g AEROSIL®200V with a solution containing 400 g denaturated alcohol (available from Aldrich), 1 g HCl (37%) and 1 g fluorosilane.

MFIL-1
The fluorosilane used in MFIL-1 was prepared by mixing a molar amount of $CH_3OC(O)CF_2O(CF_2O)_{9-11}(CF_2CF_2O)_{9-11}CF_2C(O)OCH_3$ (commercially available from Solvay Solexis under the trade designation Fomblin™ Z-DEAL) with 2 moles of aminopropyl trimethoxysilane (available from Aldrich Co). The exothermic reaction proceeded readily at room temperature, simply by mixing the starting materials.

MFIL-2
The fluorosilane used in MFIL-2 was made starting from HFPO diester as is described in US 2005/054804, example 3.

EXAMPLES

Example 1

A paste was made by mixing 100 parts PFE-1, 2.5 parts Coagent-1, 5 parts Nanogel™, 8 parts Cab-O—Sil® TS530 and 4 parts Aerosil® 200V. The paste was press cured for 45 min at 177° C., followed by 20 hrs post cure at 250° C.

The cured sample was tested for rheological properties. The results are given in table 1.

TABLE 1

| | |
|---|---|
| ML (in · lbs) | 0.34 |
| MH (in · lbs) | 8.47 |
| MH − ML (in · lbs) | 8.13 |
| tg δ @ML | 0.853 |
| tg δ @MH | 0.043 |
| Ts2 (min) | 3.96 |
| T50 (min) | 4.96 |
| T90 (min) | 6.92 |
| Hardness shA | 44 |
| Stress at 100% elongation (MPa) | 1 |
| Tensile strength (MPa) | 2 |
| Elongation at break (%) | 332 |
| Tg (° C.) | −117 |

Comparative Examples C-1 and C-2

In comparative examples C-1 and C-2 pastes were made by mixing 100 parts PFE-1, 0.439 parts or 1.5 parts urea respectively and 7.5 parts Nanogel™. The pastes were press cured for 45 min at 177° C., followed by 20 hours post cure at 250° C.

Comparative example C-1 did not cure at all, although equimolar amounts of urea were used compared to the amount of Coagent-1 used in example 1. Comparative example C-2 cured but not to an elastomer. A crumbly substance was formed, with no strength.

Example 2

In example 2, a paste was made by mixing 100 parts PFE-1, 2.5 parts Coagent-1, 6 parts Nanogel™, 5.75 parts MFIL-1 and 9.25 parts MFIL-2. The paste was press cured for 45 min at 177° C., followed by 20 hours post cure at 250° C.

The cured sample was tested for rheological properties. The results are given in table 2.

TABLE 2

| Fluoroelastomer properties | |
|---|---|
| ML (in · lbs) | 0.65 |
| MH (in · lbs) | 5.84 |
| MH − ML (in · lbs) | 5.19 |
| tg δ @ML | 0.462 |
| tg δ @MH | 0.221 |
| Ts2 (min) | 2.78 |
| T50 (min) | 2.95 |
| T90 (min) | 8.32 |
| Hardness shA | 64 |
| Stress at 100% elongation (MPa) | 1.6 |
| Tensile strength (MPa) | 2.3 |
| Elongation at break (%) | 353 |
| Tg (° C.) | −117 |

Examples 3 to 5

In examples 3 to 5, perfluoroelastomer compounds were made by mixing 100 parts PFE-1, with 1.85 parts Coagent-2 and fillers as is given in table 3. The pastes were cured according to the general procedure. The properties of the cured fluoroelastomers are shown in table 4.

TABLE 3 fluoroelastomer compounds (parts by weight)

| Ex | FC-1 | Coagent-2 | Cab-O-Sil ® TS530 | Nanogel ™ | Aerosil ® 200V | Total parts fillers |
|---|---|---|---|---|---|---|
| 3 | 100 | 1.85 | 8 | 5 | 4 | 17 |
| 4 | 100 | 1.85 | 13 | 7 | 4 | 24 |
| 5 | 100 | 1.85 | 13 | 9 | 8 | 30 |

TABLE 4

Fluoroelastomer properties

| | Ex | Ex 4 | Ex 5 |
|---|---|---|---|
| ML (in · lbs) | 0.80 | 2.09 | 4.67 |
| MH (in · lbs) | 16.86 | 19.07 | 28.48 |
| MH − ML (in · lbs) | 16.06 | 16.98 | 23.81 |
| tg δ @ML | 0.788 | 0.526 | 0.415 |
| tg δ @MH | 0.033 | 0.048 | 0.113 |
| Ts2 (min) | 13.66 | 11.81 | 6.82 |
| T50 (min) | 20.73 | 16.37 | 13.83 |
| T90 (min) | 25.51 | 19.79 | 16.54 |
| Hardness shA | 58 | 59 | 68 |
| Stress at 100% elongation (MPa) | 1.7 | 2.1 | 2.0 |
| Tensile strength (MPa) | 1.8 | 2.2 | 2.8 |
| Elongation at break (%) | 100 | 141 | 230 |
| Tg (° C.) | −115 | −115 | −116 |

The invention claimed is:

1. A method of making a fluoropolyether elastomer containing triazine groups and having a glass transition temperature of less than −40° C., comprising
   a) providing
      (i) one or more saturated fluoropolyethers containing repeating moieties selected from ($-C_4F_8O-$), ($-C_3F_6O-$), ($-C_2F_4O-$), ($-CF_2O-$) and combinations thereof and further containing at least one functional group at a terminal carbon atom of the backbone chain, or of a side chain if present, wherein the terminal carbon atom may be a primary or secondary carbon atom and wherein the functional group is capable of reacting with a functional group of the fluorinated compound according to (ii) below to form a triazine ring,
      (ii) one or more fluorinated compound selected from:
         (1) a fluorinated amidine compound selected from:
            $Rf^1-C(=NH)NH_2$ and salts thereof, and
            $H_2N(HN=)C-Rf^1-C(=NH)NH_2$ and salts thereof,
            wherein $Rf^1$ is selected from a fluorinated alkyl group having from 1 to 20 carbon atoms, a fluorinated alkylene group having from 1 to 20 carbon atoms, a fluorinated aryl group having from 1 to 20 carbon atoms, a fluorinated arylene group having from 1 to 20 carbon atoms, and a fluorinated aralkyl group having from 1 to 20 carbon atoms;
         (2) a fluorinated imidate selected from:
            $HN=C(OR^1)-Rf^1$ and salts thereof, and
            $HN=C(OR^1)-Rf^1-C(OR^{1'})=NH$ and salts thereof,
            wherein $Rf^1$ is as defined above, and wherein $R^1$ and $R^{1'}$ each represents, independently from each other, an alkyl group having from 1 to 10 carbon atoms;
         (3) a fluorinated amidrazone selected from:
            $Rf^1[-C(NH)NHNH_2]_n$ and salts thereof,
            wherein $Rf^1$ is as defined above and n is 1 or 2; and
         (4) a fluorinated amidoxime selected from:
            $Rf^1-[C(NH_2)NOH]_n$ and salts thereof,
            wherein $Rf^1$ is as defined above and n is 1 or 2; and,
   b) curing the components according to (i) and (ii) to form triazines.

2. The method of claim 1 wherein the fluoropolyether elastomer has a glass transition temperature of less than −80° C.

3. The method according to claim 1 wherein the one or more fluoropolyethers of (i) have a molecular weight of less than 15,000 g/mole.

4. The method according to claim 1 wherein the functional group of the fluoropolyethers is a nitrile group.

5. The method according to claim 1 wherein the functional group of the fluoropolyether is a nitrile group and wherein the functional group of the fluorinated compound comprises a moiety selected from amidines, amidrazones, imidates, amidoxime and salts thereof and combinations thereof.

6. A method of making an elastomer composition having a glass transition temperature of less than −40° C., a tensile strength of at least 1.5 MPa and an elongation at break of at least 50% and comprising a fluoropolyether elastomer having triazine groups, said method comprising
   a) providing of
      (i) one or more saturated fluoropolyethers containing repeating moieties selected from ($-C_4F_8O-$), ($-C_3F_6O-$), ($-C_2F_4O-$) or ($-CF_2O-$) or combinations thereof and further containing at least one functional group at a terminal carbon atom of the backbone chain or of a side chain if present and wherein the terminal carbon atom may be a primary or secondary carbon atom and wherein the functional group is capable of reacting with a functional group of the fluorinated compound according to (ii) below to form a triazine,
      (ii) one or more fluorinated compound selected from:
         (1) a fluorinated amidine compound selected from:
            $Rf^1-C(=NH)NH_2$ and salts thereof, and
            $H_2N(HN=)C-Rf^1-C(=NH)NH_2$ and salts thereof,
            wherein $Rf^1$ is selected from a fluorinated alkyl group having from 1 to 20 carbon atoms, a fluorinated alkylene group having from 1 to 20 carbon atoms, a fluorinated aryl group having from 1 to 20 carbon atoms, a fluorinated arylene group having from 1 to 20 carbon atoms, and a fluorinated aralkyl group having from 1 to 20 carbon atoms;
         (2) a fluorinated imidate selected from:
            $HN=C(OR^1)-Rf^1$ and salts thereof, and
            $HN=C(OR^1)-Rf^1-C(OR^{1'})=NH$ and salts thereof,
            wherein $Rf^1$ is as defined above, and wherein $R^1$ and $R^{1'}$ each represents, independently from each other, an alkyl group having from 1 to 10 carbon atoms;
         (3) a fluorinated amidrazone selected from:
            $Rf^1[-C(NH)NHNH_2]_n$ and salts thereof,
            wherein $Rf^1$ is as defined above and n is 1 or 2; and
         (4) a fluorinated amidoxime selected from:
            $Rf^1-[C(NH_2)NOH]_n$ and salts thereof,
            wherein $Rf^1$ is as defined above and n is 1 or 2; and,
      (iii) at least one filler,
   b) curing the components according to (i) and (ii) to form triazines.

7. The method of claim 6 wherein the elastomer composition has an elongation at break of at least 100%.

8. The method according to claim 6 wherein the elastomer composition has a tensile strength of at least 2 MPa.

9. The method according to claim 6 wherein the elastomer composition has a shore A hardness of at least 15.

* * * * *

UNITED STATES PATENT AND TRADEMARK OFFICE
CERTIFICATE OF CORRECTION

PATENT NO.         : 9,023,977 B2
APPLICATION NO.    : 13/500526
DATED              : May 5, 2015
INVENTOR(S)        : Steven Corveleyn It is certified that error appears in the above-identified patent and that said Letters Patent is hereby corrected as shown below:

In the specification

Column 7
Line 41, Delete "fluoirinated" and insert -- fluorinated --, therefor.

Column 8
Line 52-53, Delete "fluoropoylethers" and insert -- fluoropolyethers --, therefor.

Column 12
Line 57, Delete "triazines" and insert -- triazines. --, therefor.

Column 16
Line 52, Delete "@mL" and insert -- @ML --, therefor.

Signed and Sealed this
Fifteenth Day of December, 2015

Michelle K. Lee
*Director of the United States Patent and Trademark Office*